United States Patent [19]

Coleman

[11] 4,226,271

[45] Oct. 7, 1980

[54] DRUM DEBARKER

[76] Inventor: Thomas R. Coleman, Rte. 4, Yazoo, Miss. 39194

[21] Appl. No.: 917,589

[22] Filed: Jun. 21, 1978

[51] Int. Cl.³ .............................................. B27L 1/04
[52] U.S. Cl. ................................ 144/208 B; 209/288; 241/178
[58] Field of Search ............... 209/288, 297, 452, 363; 241/178; 144/208 R, 208 B

[56] References Cited

U.S. PATENT DOCUMENTS

| 1,536,491 | 5/1975 | Gunderoth | 241/178 |
| 1,966,153 | 7/1934 | Thorne | 144/208 B |
| 2,484,873 | 10/1949 | Brant | 241/178 |
| 2,819,130 | 1/1958 | Kaminsky | 241/178 X |
| 3,185,192 | 5/1965 | Delcellier | 241/178 X |
| 3,708,001 | 2/1973 | Koskinen | 144/208 B |
| 3,837,490 | 9/1974 | Driebel et al. | 209/288 |

*Primary Examiner*—W. Donald Bray
*Attorney, Agent, or Firm*—Victor J. Evans & Co.

[57] ABSTRACT

Disclosed herein is a drum type debarker for the debarking of logs and the like and there is provided a drive means for rotating the drum. The drum sits in a saddle that includes vehicle tires, and a drive mechanism is provided for rotating certain of the tires or wheels so as to rotate the drum. There is also provided a flange section on the drum that has vertically mounted tires arranged in engagement therewith for holding the drum in place.

4 Claims, 6 Drawing Figures

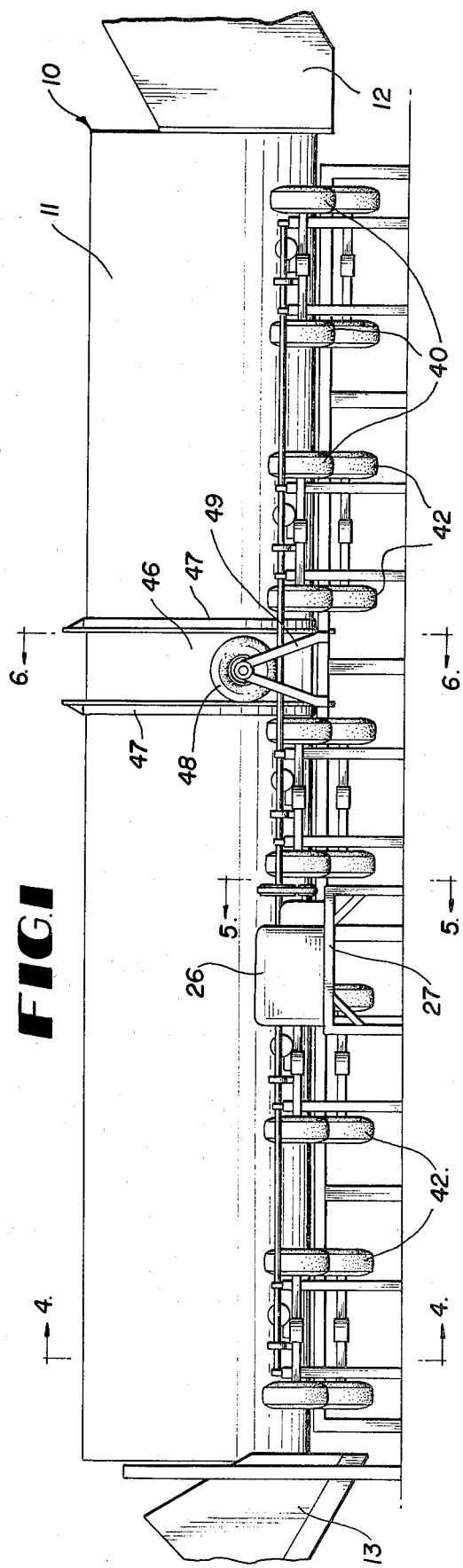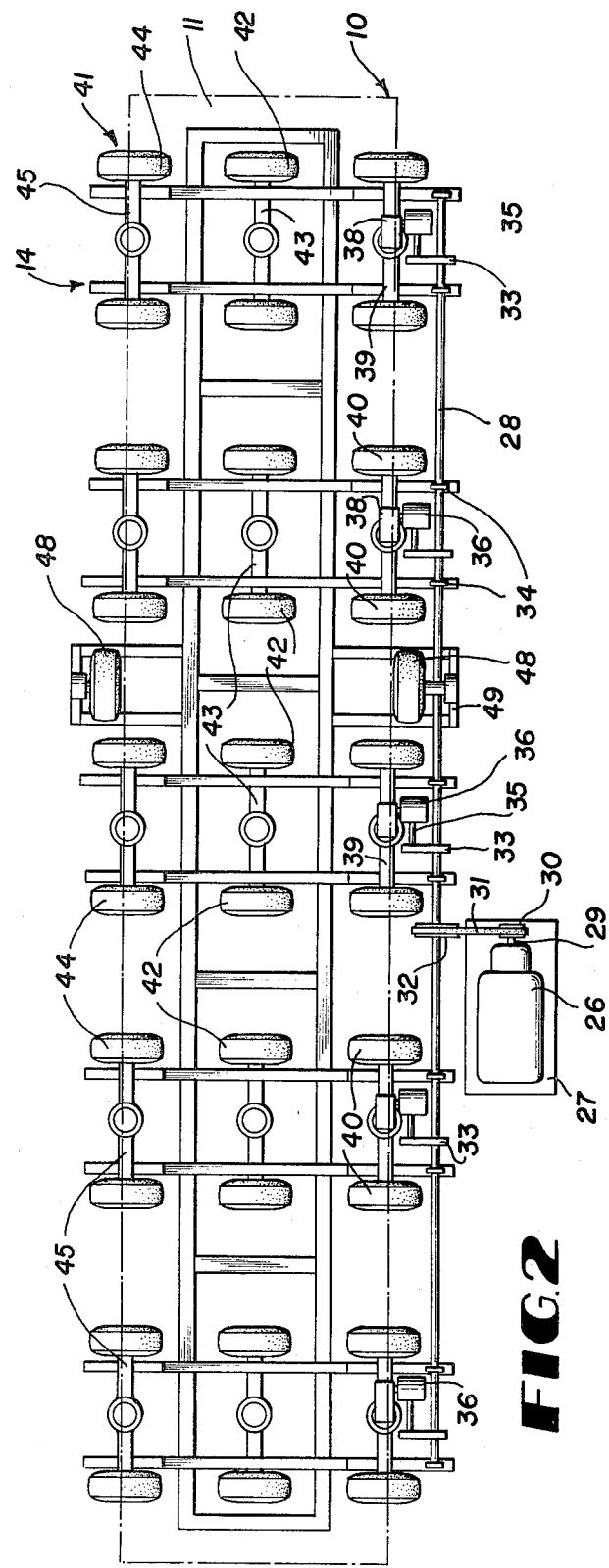

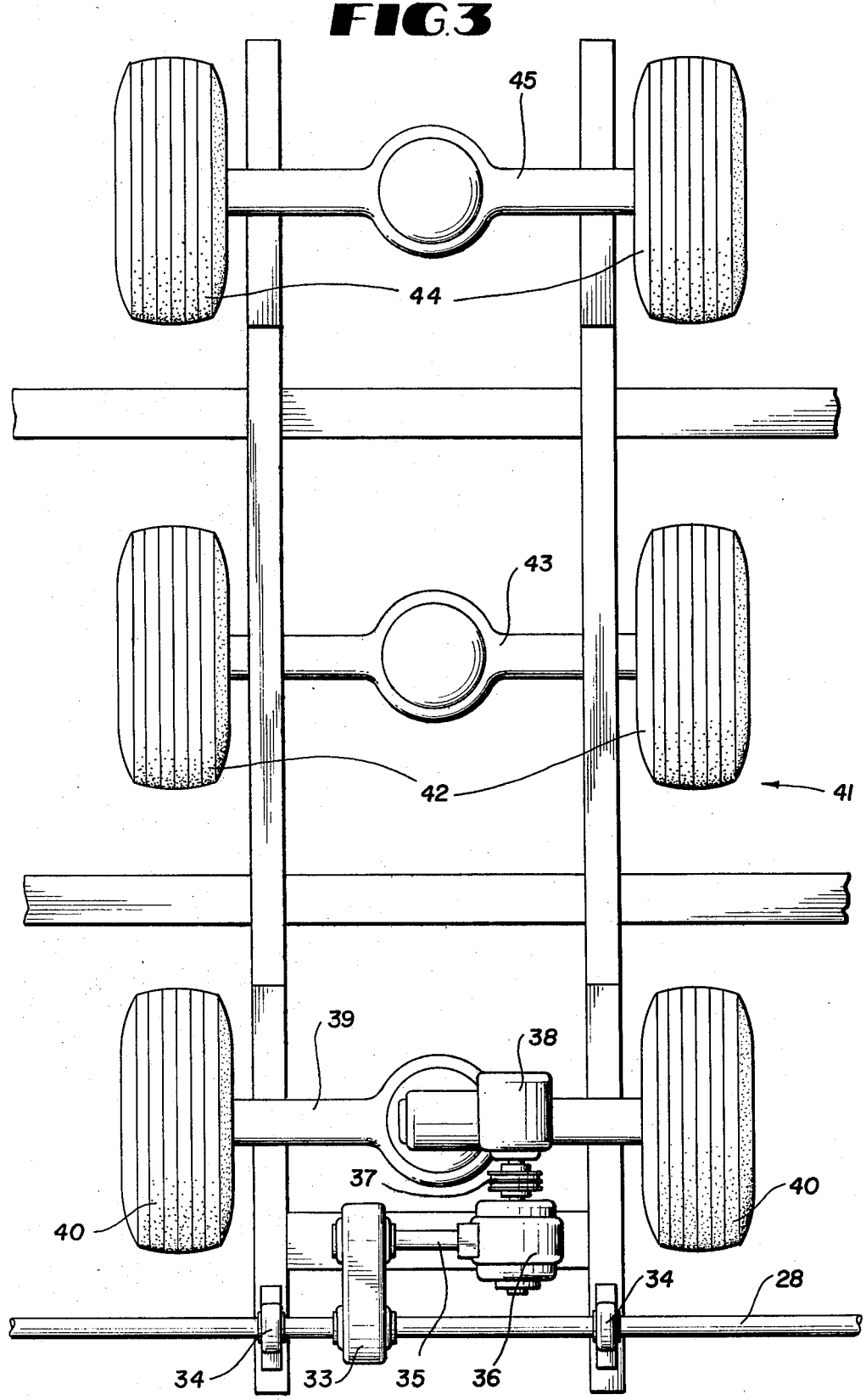

DRUM DEBARKER

BACKGROUND OF THE INVENTION

1. Field of the Invention

Various types of debarking drums have been provided as for example in debarking logs, and these drums are driven in different manners but with the present invention an improved drive means is provided for rotating the log debarking drum.

Patents of which the inventor is aware of include: U.S. Pat. Nos.

1,966,153, Thorne
3,185,192, Delcellier
3,708,001, Koskinen
3,837,490, Driebel et al None of these references anticipate the following specification and claims in that they are all relegated to well known and established techniques for rotating drums.

SUMMARY OF THE INVENTION

Accordingly the present invention provides an improved drive for rotating log debarking drums, and the drum sits in a saddle consisting of vehicle tires. A drive shaft live line shaft is provided that is rotated by an engine, and means are provided for operatively connecting the drive shaft to certain of the wheels or tires so as to rotate the drum. There is further provided a means for maintaining the drum in place as the same is rotated.

OBJECT OF THE INVENTION

The primary object of the present invention is to provide a drum debarker that includes an improved drive for rotating the drum.

Another object of the present invention is to provide a drum debarker that includes a drive mechanism that is rugged in structure and relatively simple and inexpensive to manufacture and operate.

Other objects and advantages will become apparent in the following specification when considered in light of the attached drawings.

BRIEF DESCRIPTION OF THE DRAWINGS

FIG. 1 is an elevational view of the drum debarker of the present invention;

FIG. 2 is a top plan view;

FIG. 3 is a fragmentary enlarged plan view illustrating certain constructional details of the present invention;

DESCRIPTION OF THE PREFERRED EMBODIMENT

Figure 4:
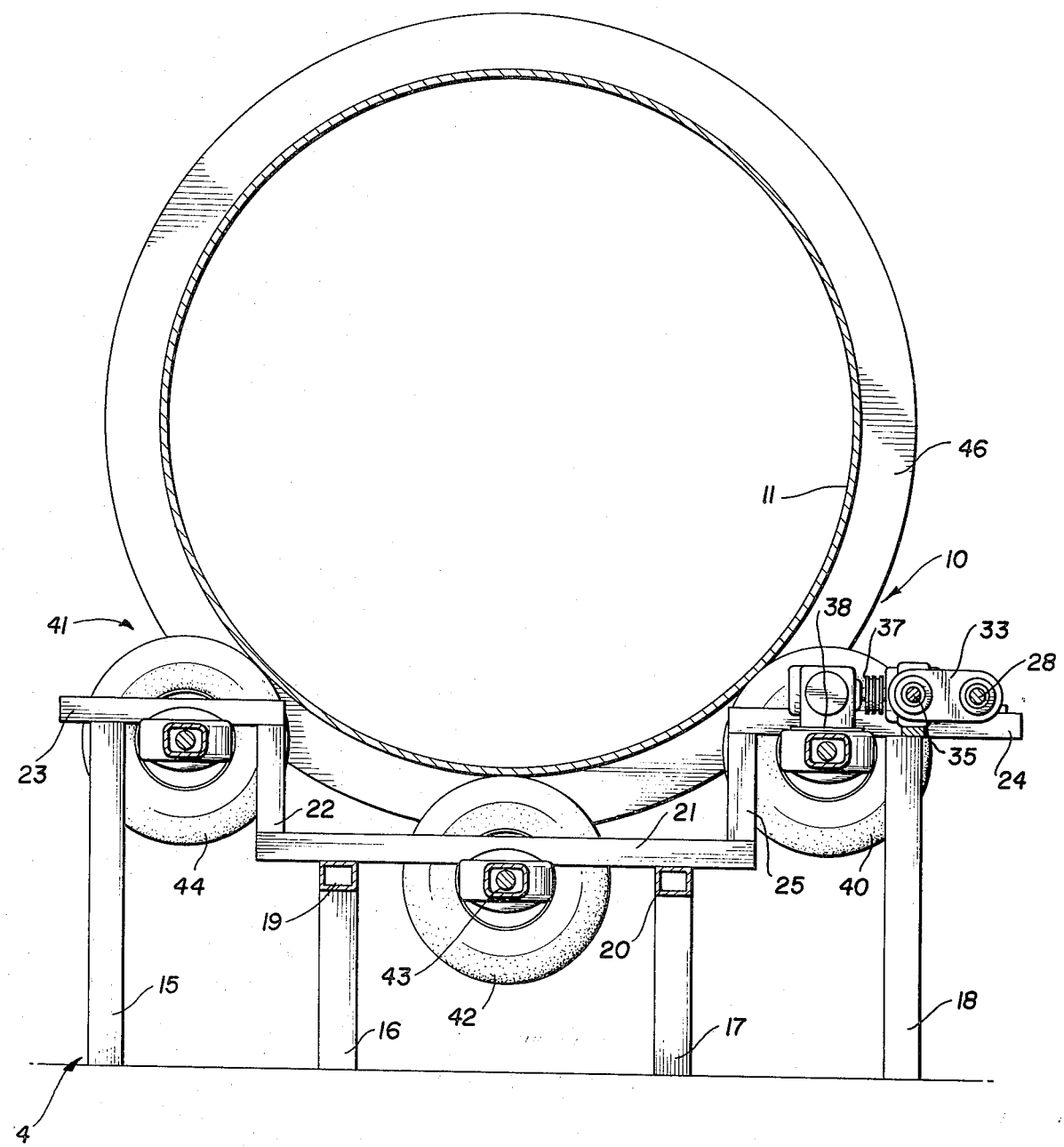
FIG. 4 is a sectional view taken on the lines 4—4 of FIG. 1.

Referring to the drawings wherein like reference characters indicate like parts throughout the figures the numeral 10 indicates the drum debarker for debarking logs and the like wherein there is provided a rotary drum 11 and the internal construction of the drum 11 forms no part of the present invention since the present invention is directed to the drive for rotating the drum 11. Suitable chutes 13 and 12 are provided, FIG. 1, whereby logs to be debarked can be supplied to one end of the drum 11, and wherein the debarked logs can be discharged from the other end of the drum 11.

A supporting frame 14 is provided that includes spaced parallel vertically disposed posts 15, 16, 17 and 18, FIG. 4. Horizontally disposed beams 19 and 20 are supported on certain of the posts such as the posts 16 and 17, and horizontally disposed support members 21 are mounted on the beams 19 and 20. Uprights 22 and 25 are mounted on the ends of the support members 21, and horizontally disposed support elements 23 and 24 are supported from the upper ends of certain of the uprights and posts as shown in drawings.

Figure 5:
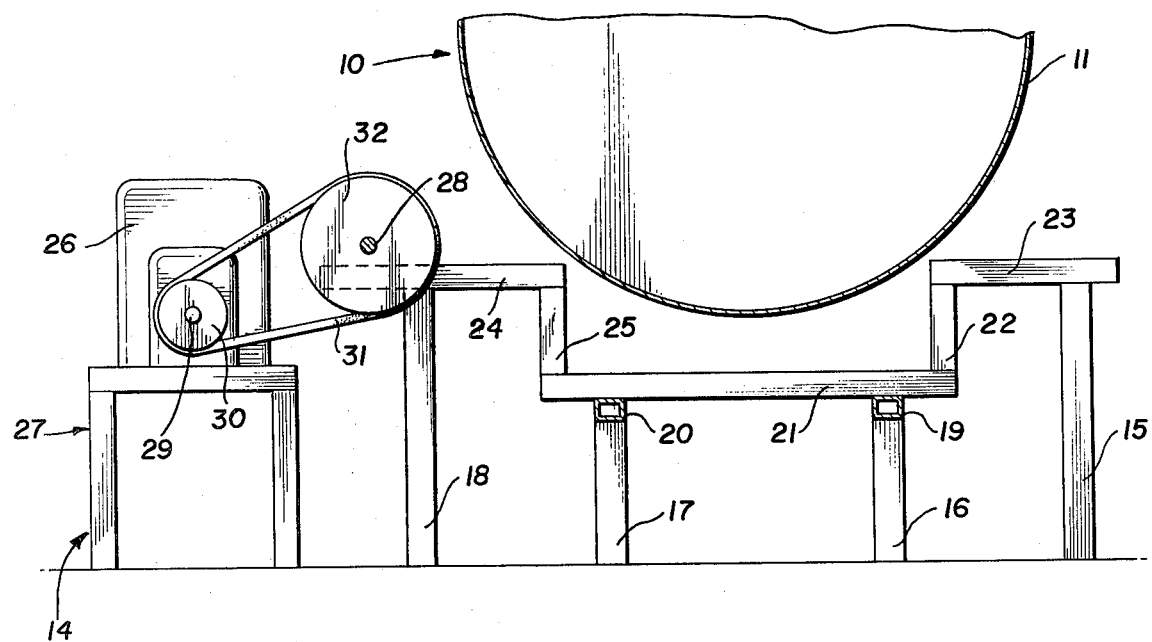
FIG. 5 is a sectional view taken on the lines 5—5 of FIG. 1.

As shown in FIG. 5, an engine 26 is supported on a platform 27, and the engine 26 is spaced outwardly from the frame 14. The engine 26 rotates a shaft 29 and has a pulley 30 thereon, and an endless belt 31 is trained around a pulley 30 that is driven by the shaft 29. The belt 31 is trained around the pulley 32 that is mounted on a drive shaft 28.

The drive shaft 28 is supported on the frame by means of bearings 34, and chain type gear boxes 33 are operatively connected to and driven by the shaft 28. Gear type boxes 36 are driven by the chain type gear units 33 as at 35, and the numeral 37 indicates chain couplets that are driven by the gear type elements 36. Differentials 38 are driven from the chain couplets 37, an axle housing 39 have shafts therein for rotating wheels 40 having tires thereon.

Wheels 42 and 44 cooperate with the wheels or tires 40 to provide a saddle 41 for supporting the drum 11. The wheels 42 include differentials 43 and the wheels 44 include differentials 45.

Figure 6:
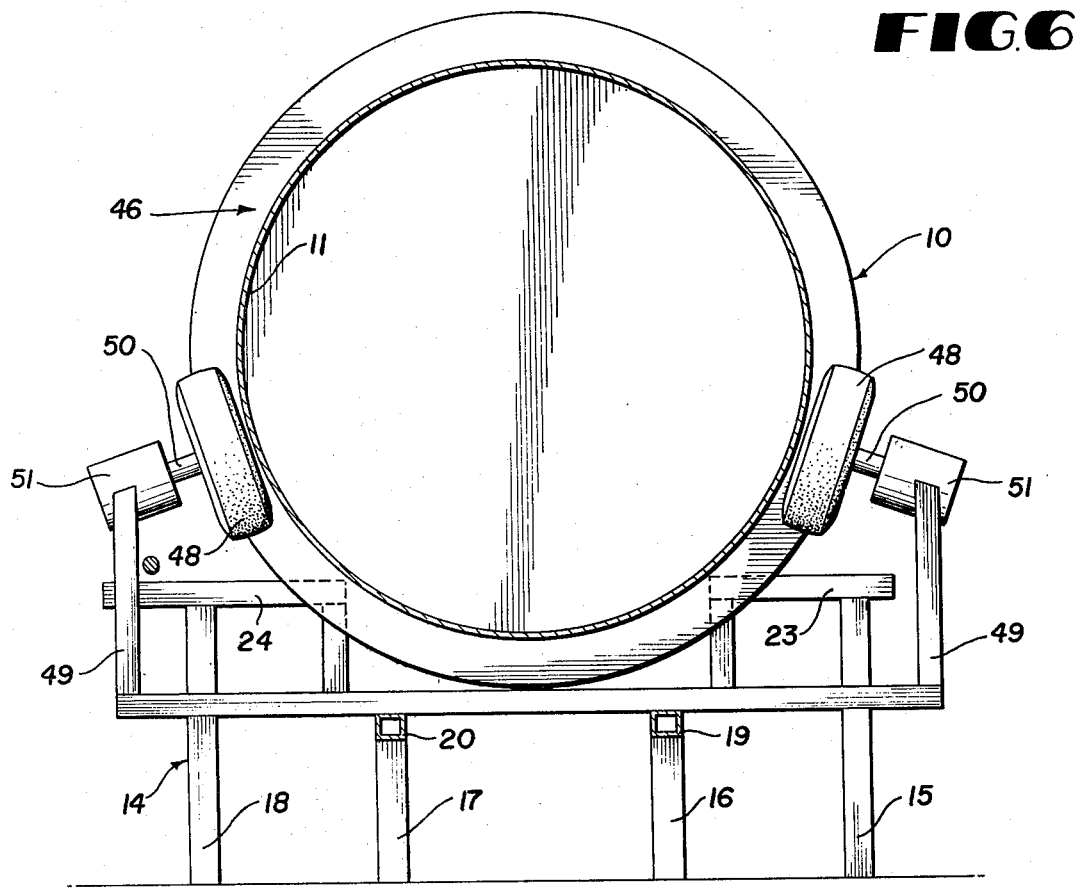
FIG. 6 is a sectional view taken on the lines 6—6 of FIG. 1.

The drum 11 is provided with a flanged section 46 that includes flange elements 47 adjacent thereto, and vertically disposed tires 48 engage the flanged sections 46 while helping to maintain the parts in their proper position. The wheels 48 are supported by means of braces 49, and the wheels 48 have shafts 50 connected thereto, and suitable support pieces 51 are provided for the shafts 50, FIG. 6. As can be seen from a close perusal of FIG. 6, the axes of rotation of wheels 48 coincide with a radial line extending perpindicularly from the axis of rotation of the drum 11.

From the foregoing, it will be seen that there has been provided a drive mechanism for rotating a drum such as the drum 11 of a log debarker 10. In use, with the parts arranged as shown in the drawings, the logs to be debarked are adapted to be fed into one end of the drum 11 from a suitable source of supply, and the debarked logs are discharged at the other end of the drum 11, and suitable chutes 12 and 13 are provided for loading and unloading the drum 11. The interior of the drum 11 is of conventional construction as previously noted, and the present invention is directed to the drive mechanism for rotating the drum 11 so that the debarking will take place.

In accordance with the present invention an engine 26 is mounted in a suitable location such as on a platform 27, and the engine 26 rotates a shaft 29. As the shaft 29 turns, it rotates a pulley 30, FIG. 5, whereby an endless belt 31 will be turned so as to rotate a pulley 32 that is mounted on the live or drive shaft 28.

The shaft 28, as it rotates, serves to actuate the chain type gear boxes 33, and the chain type gear boxes 33 serve to actuate the gear type gear boxes 36 as for example by means of the driven shaft 35. The gear type gear boxes 36 are connected to the differentials 39 by means of the chain couplets 37 and this will therefore cause rotation of the wheels 40. Because the wheels 40 are arranged in engagement with the outer periphery of the drum 11, it will be seen that this rotation of the tires 40 causes the desired rotation of the drum 11.

The drum 11 is supported on a saddle which includes the wheels 40 as well as the wheels 42 and 44. The tires 42 and 44 are merely support or idler wheels for the rotating drum, and all of the power for rotating the drum 11 is supplied by the rotating wheels 40. The wheels are arranged as shown in FIG. 4 so that the sets or pairs of wheels 40 and 44 are generally in the same plane, and the wheels 42 are arranged at a lower level from the sets of wheels 40 and 44 so that a saddle type support is provided for the rotating drum 11. Suitable frame pieces are provided for supporting the differentials and corresponding wheels.

Arranged or mounted on the drum 11 is a flanged portion 46 which has guide wheels 48 arranged in engagement therewith, and the wheels 48 help maintain the rotating drum 11 in its proper position.

The parts can be made of any suitable material and in different shapes or sizes as desired or required.

As shown in the drawings, between each set of the tires 40 are gear boxes. The drum type debarker itself, that is the drum 11 is of the usual type such as those found in conjunction with paper mills or other facilities. However the drive for the drum 11 is entirely different from previous drives for such drums.

The drum 11 sits in a saddle made of a suitable number of tires such as 30 20 inch truck tires. Ten of these tires may be arranged on the right side to provide the drive or pull for the entire mechanism. Ten tires such as the tires 42 can be arranged under the bottom, and ten tires 44 on the opposite side are idlers. On the drive side there is a live line shaft 28 which extends the entire length of the drum which may be sixty feet long, and the live line shaft 28 is pulled or operated by an engine such as the engine 26. Operatively connected to the shaft 28 are the chain type gear boxes 33 which are operatively connected to gear type boxes 36 as at 35, and the members 36 are coupled as at 37 to the truck differentials which are connected to the tires 40. The flanged portion 46 has tires 48 arranged in engagement therewith so that the drum will held in place, and one of the tires 48 is arranged on each side of the drum.

A suitable gear ratio is provided between the parts such as the gear type gear boxes and the chain type gear boxes and chain couplers.

The tires on which the drum is turning are inflated. This allows the tires to absorbe the shock and lessen or completely dispel the need of maintenance on the drum. Other drums roll on steel wheels causing vibration and metal fatigue.

Having thus described the preferred embodiment of the invention it should be understood that numerous structural modifications and adaptations may be resorted to without departing from the spirit of the invention.

What is claimed is:

1. An apparatus for debarking logs comprising a drum having cylindrical configuration and open end faces for the ingress and egress of logs, a support stand underlying said drum having a depressed central area and raised side areas, plural arrays of inflated tires carried by said support stand and rotatably supporting said drum, motor means carried on said support stand having a drive mechanism powering at least one of said arrays for rotating said drum, a pair of spaced parallel circumferential flanges disposed on said drum, a tire rotatably carried on said support means, said tire contacting said flanges and being disposed and extending between said flanges such that a radial line from said cylinder coincides with the axis of rotation of said tire, whereby engagement of said tire with said flanges constrains said drum from axial translation.

2. The device of claim 1 in which said arrays are formed from plural pairs of tires spaced apart and supported on said support stand by axles, and a differential on said axle interconnects said pairs of tires to synchronize their rotation.

3. The device of claim 2 in which said motor means drives plural arrays of tire pairs through a single shaft extending the entire length of the arrays and said shaft is connected to said pairs at the differential by means of a second differential connected thereto, said second differential connected to the shaft through a chain coupler which is driven by a gear box which in turn is driven by a chain coupler that rotates with the shaft.

4. The device of claim 3 in which the motor means is connected to the shaft by a pair of pulleys one disposed on the motor, one on the shaft, and a belt interconnects said pulleys.

* * * * *

UNITED STATES PATENT AND TRADEMARK OFFICE
CERTIFICATE OF CORRECTION

PATENT NO. : 4,226,271
DATED : October 7, 1980
INVENTOR(S) : Thomas R. Coleman

It is certified that error appears in the above-identified patent and that said Letters Patent are hereby corrected as shown below:

Claim 1, col. 4, line 23 "a pair of spaced parallel" should be removed;

line 24 "flanges" should be removed and --flange means-- inserted;

line 26 "flanges and being disposed and extending" should be removed;

line 27 "between said flanges" should be removed and --flange means-- inserted;

line 29 "flanges" should be removed and --flange means-- inserted.

Signed and Sealed this

Third Day of November 1981

[SEAL]

Attest:

GERALD J. MOSSINGHOFF

Attesting Officer — Commissioner of Patents and Trademarks